United States Patent
Hegyi

[11] Patent Number: 5,235,178
[45] Date of Patent: Aug. 10, 1993

[54] LIGHT SENSOR WITH DIFFUSER AND EYE-LIKE RESPONSE

[76] Inventor: Dennis J. Hegyi, 1708 Morton Ave., Ann Arbor, Mich. 48104

[21] Appl. No.: 857,547

[22] Filed: Mar. 25, 1992

Related U.S. Application Data

[63] Continuation-in-part of Ser. No. 770,677, Oct. 30, 1991.

[51] Int. Cl.⁵ ............................................. G01J 3/50
[52] U.S. Cl. ..................................... 250/226; 356/218
[58] Field of Search .................... 250/226, 214 AL; 356/218-228; 315/149-159, 82, 83; 307/10.8

[56] References Cited

U.S. PATENT DOCUMENTS

| | | | |
|---|---|---|---|
| 4,417,818 | 11/1983 | Weisner | 356/418 |
| 4,687,329 | 8/1987 | Schultz | 250/226 |
| 4,827,118 | 5/1989 | Shibata et al. | 250/226 |
| 4,968,895 | 11/1990 | Leclercq | 315/82 |

Primary Examiner—David C. Nelms
Assistant Examiner—Que T. Le
Attorney, Agent, or Firm—Rohm & Monsanto

[57] ABSTRACT

A twilight sensor for controlling the headlamps of vehicles employs a photodiode having a predetermined spectral response and a diffuser which also has a predetermined spectral response, the spectral responses being combined to achieve an overall spectral response which corresponds to that of the human eye. With this arrangement, the headlamps of a motor vehicle are turned on and off under different ambient light conditions, in a manner which corresponds to the perception of the driver. In addition, the invention employs a control system which turns the lights on rapidly after the vehicle enters a tunnel.

15 Claims, 4 Drawing Sheets

LIGHT SENSOR WITH DIFFUSER AND EYE-LIKE RESPONSE

RELATIONSHIP TO OTHER APPLICATION

This application is a continuation-in-part of copending U.S. Ser. No. 07/770,677, filed Oct. 30, 1991, the disclosure of which is incorporated herein by reference.

BACKGROUND OF THE INVENTION

This invention relates generally to systems for producing responses to ambient light which corresponds to the response of a human eye, and more particularly, to a system which is particularly adaptable to the control of headlamps in vehicles in response to changes in the incident ambient light.

Headlamp control systems for use in vehicles, which systems are also known as "twilight sensors," have several shortcomings, most of which are derived from the fact that a known twilight sensor responds differently to ambient light than a human eye. As a result of this different response characteristic, twilight sensors will respond differently than the eye as each is subjected to different lighting conditions.

As an example of the foregoing, assume, for the moment, that a twilight sensor is adjusted to actuate the headlamps of a vehicle at 200 foot-candles under a cloudless sky. Such a setting might cause the headlamps to be turned on at 100 foot-candles on a cloudy day. A foot-candle is a unit of light intensity which takes into account the spectral response of the human eye to light. As is known, the human eye is most sensitive to green light, and therefore less light energy in the form of green light is required to obtain the same response to the eye, as, for example, red light.

One known twilight sensor system employs a blue filter followed by a photoresistive cell, or a photodiode, whereby the light sensor will respond only to blue light. The blue filter is intended to reduce the sensitivity of the twilight sensor to street lights which radiate mostly yellow and red light. Clearly, this known twilight sensor system will not correspond in its operation to the light which is seen by a human eye.

It is, therefore, an object of this invention to provide a system which is responsive to ambient light in accordance with a characteristic which corresponds to that of a human eye.

It is another object of this invention to provide a system for controlling the operation of the headlamps of a vehicle, whereby the headlamps are operated in a manner consistent with the perception of the ambient light by a human operator of the vehicle.

In addition to the foregoing, there is a need for a twilight sensor to respond quickly to the rapid changes in the intensity of ambient light, particularly when the ambient light rapidly becomes diminished, as would be the case when a vehicle which enters a tunnel. Thus, it is also an object of this invention to provide a twilight sensor arrangement which can respond quickly to actuate the headlamps when the ambient light diminishes rapidly, without responding to electrical noise or transient ambient light.

It is a further object of this invention to provide a headlamp control system for a vehicle wherein it will always appear to the driver that the headlamps are turning on when the sky reaches the same light brightness.

It is additionally an object of this invention to provide a headlamp control system which actuates the headlamps of a vehicle in a manner consistent with the perception of a human eye, irrespective of whether the ambient conditions are clear or cloudy.

SUMMARY OF THE INVENTION

The foregoing and other objects are achieved by this invention which provides in a first aspect thereof a photosensor arrangement for producing an electrical signal which is responsive to an input light. The photosensor arrangement is provided with a light diffuser having an input for receiving the input light and a diffuser output for producing a diffused output light. Also, the light diffuser has a predetermined spectral characteristic whereby the diffuser output light corresponds to the input light modified in accordance with the predetermined diffuser spectral characteristic. The invention is further provided with a light sensor which has a sensor light input for receiving the diffused output light, and an output terminal for providing an output electrical signal which is responsive to the diffused output light. The light sensor itself has a predetermined sensor spectral characteristic whereby the output electrical signal is representative of the input, or ambient, light as modified by the spectral characteristics of the light diffuser and the light sensor. The combined spectral characteristics correspond to that of a human eye.

The combination of the diffuser and sensor spectral characteristics is achieved in accordance with the relationship:

$$E(\lambda) = c(F(\lambda))(S(\lambda)) \qquad (1)$$

where $(F(\lambda))$ corresponds to the diffuser spectral characteristic, $(S(\lambda))$ corresponds to the sensor spectral characteristic, $(E(\lambda))$ is the response characteristic of the human eye, and c is a constant.

Using a diffuser with a predetermined spectral characteristic rather than, for example, a filter, improves the twilight sensor in at least four significant ways. Because the diffuser scatters incident light from any direction into all directions, some light from every point on the sky is scattered into the light sensor. In this way, the diffuser serves to increase the angular field of view of the photosensor arrangement. Thus, it is an advantage that by sampling a greater fraction of the light coming from the whole sky, rather than the light coming from directly overhead, the system is less sensitive to the detailed position of individual clouds. One bright cloud directly overhead will not disproportionately affect the sensor output. Second, as a result of the typical driving position and the location of the roof line of a vehicle, drivers rarely see the sky directly overhead, it is more important that a twilight sensor have sensitivity at larger zenith angles. Third, an increase in the angular field of view of the arrangement reduces the sensitivity of the twilight sensor to street lights. Since a street light is only bright over a relatively narrow angular range, it does not generate a large signal relative to the sky which fills the large angular field of view of the twilight sensor. Fourth, because the diffuser relatively uniformly scatters the light over a large area, the response characteristics of the system do not depend on the precise placement of the light sensitive element. The exact placement of the light sensitive die in a photodiode varies from part to part and the diffuser makes the photodiode insensitive to manufacturing variations.

In certain embodiments of the invention, the angular field of view is controlled by utilizing a light modulator which can reduce the sensitivity of portions of the field of view to, for example, light coming directly from above. In this manner, the sensitivity of the system to overhead light would be reduced, but it would still remain sensitive to light from the sky, i.e., at larger angles with respect to the zenith. The resulting modification of the angular response pattern of the system would tend to eliminate the effects of street lights on the system.

One simple way to increase the field of view of the photosensor system is, as stated, to include a diffuser. A second approach to increasing the angular field of the sensor is to use a light conduit working on the principle of total internal reflection which would funnel the rays of incident light from a large angular area onto the detector itself. In such an embodiment, the filter could be incorporated directly into the light conduit. Thus, if desired, a light modulator or a mask could be applied to configure the field of view, as desired.

As previously indicated, one important use of the photosensor arrangement of the present invention, is to control the operation of the headlamps in vehicles. Thus, in one embodiment, there is provided a lamp control system coupled to the output terminal of the light sensor for controlling the headlamp, or any other lamp, in response to the input light. In such a control system, certain embodiments would be provided with a noise suppression delay system for preventing actuation of a lamp for a predetermined period of time after a sudden change in the intensity of the incident light. Such a delay, which may be on the order of thirty seconds, serves to prevent actuation of the lamps in response to electrical noise or transient incident light. In still further embodiments, there is provided a timer for actuating the lamp within a predetermined period after a sudden diminution in the intensity of the input light. This is important for situations such as where a vehicle enters a tunnel, and a fairly rapid actuation of the headlamps is required. Thus, if the brightness level went from light to dark in, for example, less than 0.5 seconds, and stayed at that level for 1 second, the system would turn on the headlamps, because these conditions are characteristic of the vehicle entering a tunnel.

In accordance with a further aspect of the invention, a light-responsive element which produces at an electrical output thereof an electrical signal responsive to illumination by an incident light received at a light-sensitive optical input, having a predeterminable spectral characteristic receives its input light from a light diffuser. The diffuser also has a predetermined spectral characteristic, and receives the light after it travels past a light modulator. The light modulator can be configured to reduce the intensity of light from predetermined parts of the sky which reaches the diffuser, thereby enabling the determination of the angular orientation of the incident light with respect to the apparatus of the invention.

In accordance with a headlamp control system aspect of the invention, a lamp control system, which may be in the form of circuitry, is coupled to the output terminal of the photodetector. As previously stated, the photodetector receives its input light via a diffuser, and each has a predeterminable spectral response. The overall spectral response of the system, which corresponds to that of the human eye, is formed by a combination of the spectral responses of the diffuser and the photodetector.

BRIEF DESCRIPTION OF THE DRAWING

Comprehension of the invention is facilitated by reading the following detailed description, in conjunction with the annexed drawing, in which.

DETAILED DESCRIPTION

Figure 1:
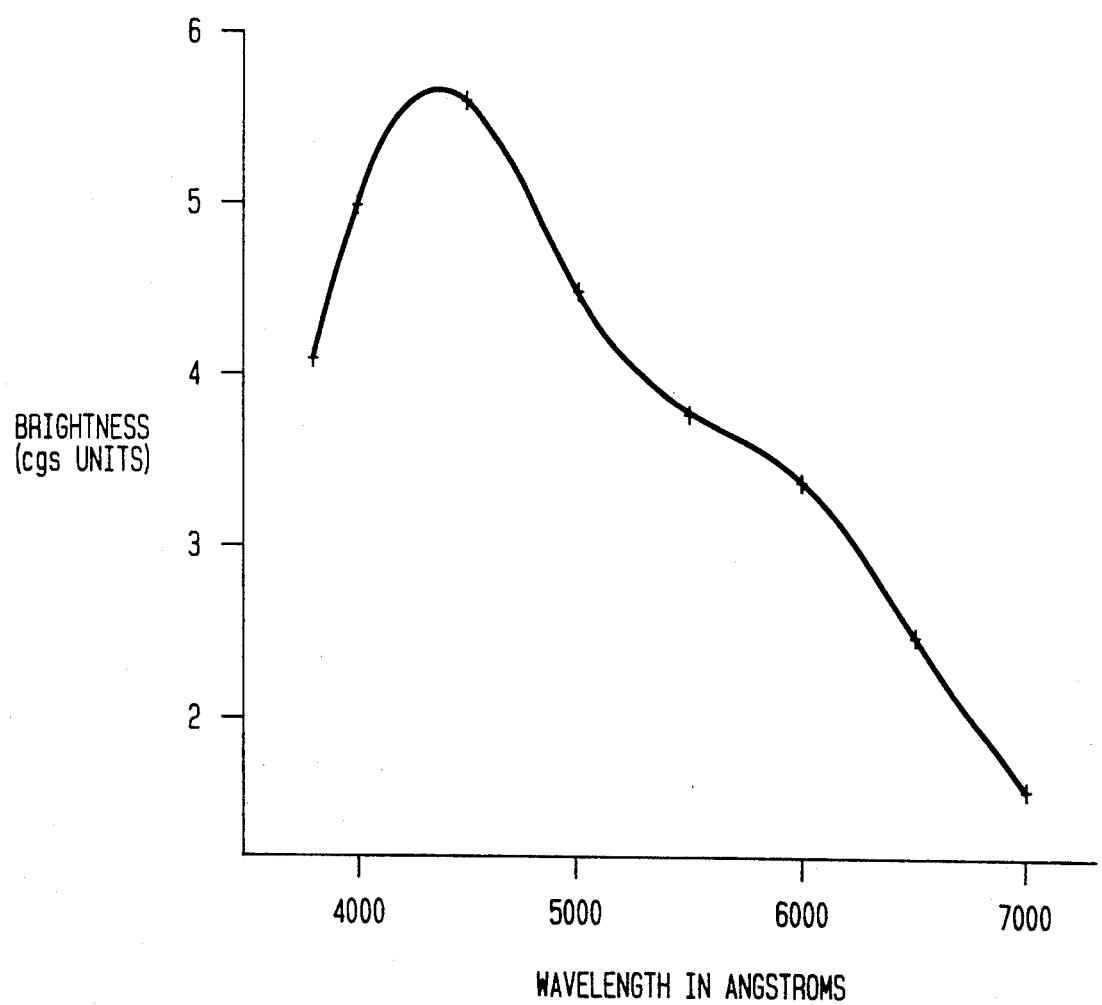
FIG. 1 is a graphical representation which depicts the characteristic spectrum of the sky.

FIG. 1 is a graphical representation of a characteristic spectrum of the sky during the day. As shown, the characteristic spectrum has a maximum brightness at about 4400 Å, and as one would expect, the peak is in the blue portion of the spectrum. Clouds, on the other hand, which are illuminated by the sun and scatter all wavelengths with equal efficiency so they look white in sunlight, have a spectrum very similar to that of the solar spectrum.

Figure 2:
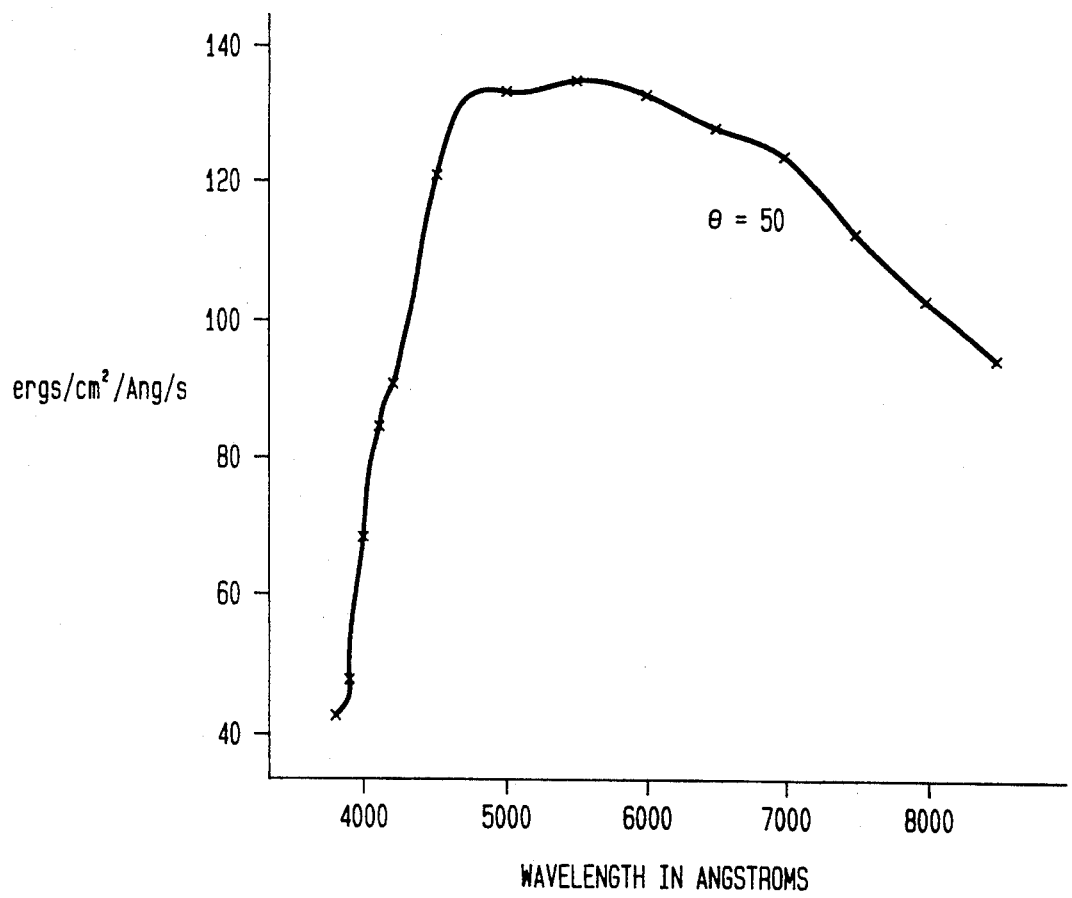
FIG. 2 is a graphical representation which depicts the characteristic of the solar spectrum at sea level.

FIG. 2 is a graphical representation of a characteristic solar spectrum at sea level, during the day. This characteristic spectrum is viewed at a zenith angle of $\theta = 50°$, where $\theta = 0°$ is directly overhead. It is evident that the spectra of FIGS. 1 and 2 are quite different from one another, and that any detector which does not have a spectral response like that of a human eye will respond differently to sources with different spectral properties. However, if one had a sensor arrangement, such as a twilight sensor for the control of the headlamps of a motor vehicle, with the same spectral response as the human eye, it would respond like the eye to all sources of optical radiation, independent of their spectral properties. As previously stated, the response of the human eye $E(\lambda)$ to a light at a given wavelength $\lambda$, is known using standard responses. More specifically, the spectral sensitivity of the eye is a function of light intensity, and for precise work, one should use the most appropriate spectral intensity distribution for the eye at the light level of interest. The spectral responses of the sensor, the diffuser, and the eye, are related as set forth above in equation (1).

The following table contains the numerical details for applying a procedure to determine the appropriate diffuser transmission function to make a photodiode respond to light like the human eye.

| (1) Wavelength (nm) | (2) Response of Eye | (3) Photodiode Response | (4) (2)/(3) | (5) Normalized Transmission |
|---|---|---|---|---|
| 410 | 0.0012 | 0.14 | 0.0086 | 0.0042 |
| 430 | 0.0116 | 0.17 | 0.0682 | 0.0332 |
| 450 | 0.0380 | 0.21 | 0.1810 | 0.0882 |
| 470 | 0.0910 | 0.25 | 0.3640 | 0.1774 |
| 490 | 0.2080 | 0.29 | 0.7172 | 0.3495 |
| 510 | 0.5030 | 0.35 | 1.4370 | 0.7003 |
| 530 | 0.8620 | 0.42 | 2.0520 | 1.0000 |
| 550 | 0.9950 | 0.50 | 1.9900 | 0.9698 |
| 570 | 0.9520 | 0.52 | 1.8310 | 0.8923 |
| 590 | 0.7570 | 0.54 | 1.4020 | 0.6832 |
| 610 | 0.5030 | 0.58 | 0.8672 | 0.4226 |

| (1) Wavelength (nm) | (2) Response of Eye | (3) Photodiode Response | (4) (2)/(3) | (5) Normalized Transmission |
|---|---|---|---|---|
| | | -continued | | |
| 630 | 0.2650 | 0.65 | 0.4077 | 0.1987 |
| 650 | 0.1070 | 0.71 | 0.1507 | 0.0734 |
| 670 | 0.0320 | 0.73 | 0.0438 | 0.0212 |
| 690 | 0.0082 | 0.75 | 0.0109 | 0.0053 |

As shown in the table, column (2) is the standard CIE response of the eye to relatively bright light, column (3) is the response of a typical silicon photodiode to light, and column (4) is the quotient of the value appearing in column (2) divided by the corresponding value in column (3). Column (5) contains the numbers in column (4) divided by 2.0520, which normalizes the peak response of the diffuser to unity. To within an arbitrary multiplicative constant c, this is the ideal spectral response to combine with the spectral response of the photodiode to match the response of the eye under bright light. It should be noted, however, that at lower levels of illumination, the spectral sensitivity of the eye shifts toward 440 nm. Thus, the numbers given in column (2) would need to be changed depending on the level of illumination at which the invention was designed to operate.

As previously indicated, it is desirable to increase the angular field of view of a twilight sensor. Also as indicated, one way to increase the angular field of view is to include a diffuser arranged in combination with a photodiode, as will be described hereinbelow with respect to FIG. 4.

Figure 3:
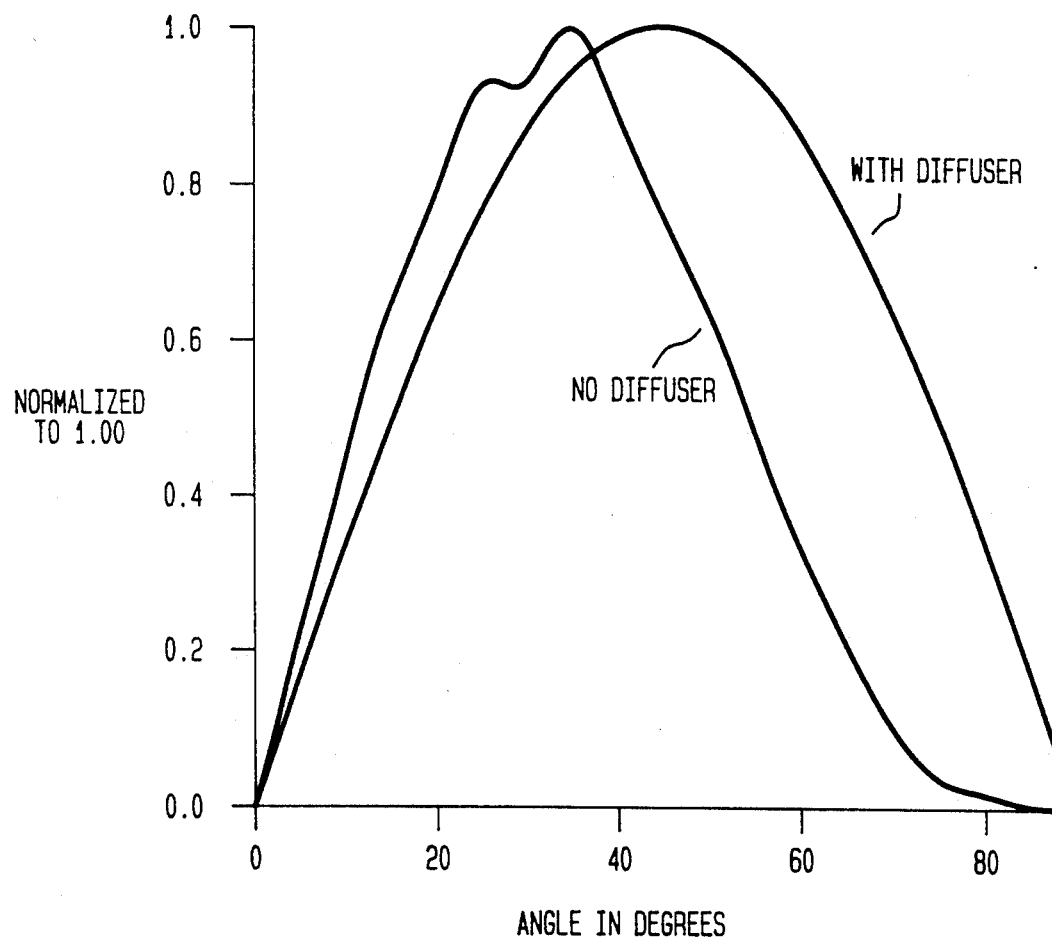
FIG. 3 is a graphical representation of the normalized responses of a system with and without a diffuser for increasing the angular view.

FIG. 3 is a graphical representation which illustrates a comparison of the relative amount of light collected by a system which consists of a photodiode packaged in a TO-5 metal can and a filter, and the same photodiode with an added flat diffuser. As can be seen, the left-hand side of both curves are quite similar, since both systems collect light efficiently at small angles. However, the response of a photodiode in a TO-5 can begins to fall off at about 20°, and this is mainly what limits the angular response of the system. On the other hand, the relative amount of light collected by a system with a flat diffuser is proportional to $\sin \theta \cos \theta$. For that matter, any dome-like shaped diffuser would be even more effective in collecting and detecting light at large $\theta$, i.e., close to the horizon.

It should be noted that the angular response of a diffuser-photodiode system is independent of the angular response of the photodiode, but only depends on details of the diffuser. For a flat diffuser, the $\sin \theta$ term which is larger at larger $\theta$ indicates how the sky area (solid angle) changes with $\theta$, while the $\cos \theta$ term, which decreases with increasing $\theta$, shows how the projected area of a flat diffuser changes with $\theta$. Thus, adding a diffuser simplifies the manufacturing of twilight sensors in a reproducible way, since their response would not be sensitive to the exact location of the sensitive silicon die at the bottom of the TO-5 metal can.

Figure 4:
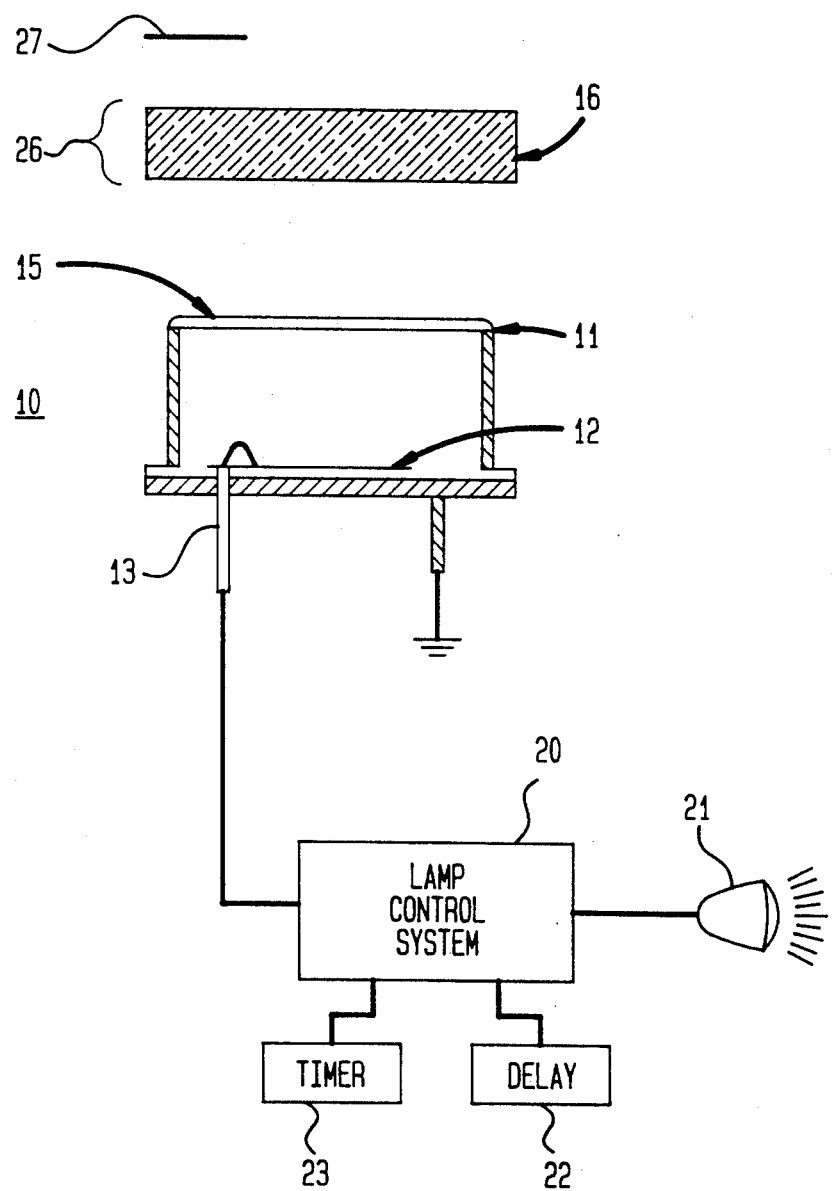
FIG. 4 is a schematic representation of a twilight sensor system constructed in accordance with the principles of the invention.

FIG. 4 is a schematic representation of a specific illustrative embodiment of the invention in the form of a twilight sensor 10. As shown, twilight sensor 10 has a photodiode 11, contained, in the embodiment, within a TO-5 metal can. Light input 15 of photodiode 11 has a diffuser 16 arranged thereover, in this embodiment.

A silicon die 12 is shown arranged at the bottom of the photodiode arrangement, and is connected electrically to an output terminal 13. Output terminal 13 is coupled to a lamp control system 20, which is coupled at an output thereof, with a lamp 21. As previously stated, lamp control 20 is provided with a 30-second delay 22 which serves to prevent actuation of lamp 21 in response to transient light events. In addition, the lamp control system is provided with a timer 23 which is initiated by a sudden decrease in the brightness level, such as occurs when a vehicle enters a tunnel. As previously indicated, the timer is effective for approximately 1 second before causing lamp control 20 to actuate lamp 21.

In the specific illustrative embodiment of FIG. 4, diffuser 16 has a thickness represented in the figure as 26, which in this embodiment, achieves the functionality of a light conduit. Light which impinges the uppermost surface of diffuser 16, which is flat in this embodiment, is propagated throughout thickness 26 toward light input 15 of photodiode 11. Also in this embodiment, a light modulator 27 is shown schematically and serves to achieve an angular sensitivity to the incoming light. Light modulator 27 may be as simple as an opaque barrier which, as shown in FIG. 4, is separated by a predetermined distance from the surface of diffuser 16. By way of example, if a light source (not shown) is arranged above and to the left of the top surface of diffuser 16, light modulator 27 will cast a relatively long shadow across said top surface. As the light source is moved so as to be directly overhead, the length of the shadow is diminished, and as the light source is moved further toward the right, the shadow may be off of the light-receiving surface of the diffuser entirely. Thus, this simple light modulator achieves angular sensitivity of the overall response of twilight sensor 10.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A photosensor arrangement for producing an electrical signal responsive to an input light, the photosensor arrangement comprising:

light diffuser means having a diffuser input for receiving the input light and a diffuser output for producing a diffused output light which is scattered in many directions unrelated to a direction of incidence of the input light, said light diffuser means having a predetermined spectral characteristic whereby the diffuser output light corresponds to the input light modified in accordance with the predetermined diffuser spectral characteristic; and light sensor means having a sensor light input for receiving the diffused output light and an output terminal for providing an output electrical signal responsive to said diffused output light, said light sensor means having a predetermined sensor spectral characteristic whereby the output electrical signal is representative of a response characteristic applied to the input light which corresponds to that of a human eye.

2. The photosensor arrangement of claim 1 wherein said predetermined diffuser spectral characteristic $(F(\lambda))$ and said predetermined sensor spectral characteristic (S(λ)) are related to the response characteristic of the eye (E(λ)), in accordance with the relationship:

$$E(\lambda) = c(F(\lambda))(S(\lambda))$$

where c is a constant.

3. The photosensor arrangement of claim 1 wherein there is further provided light modulator means for controlling an angular field of view of the photosensor arrangement.

4. The photosensor arrangement of claim 1 wherein said light diffuser means comprises a light conduit with a predetermined spectral characteristic for collecting and diffusing the input light and directing same to the light sensor means.

5. The photosensor arrangement of claim 1 wherein there is further provided lamp control means coupled to said output terminal of said light sensor means for controlling a lamp in response to said input light.

6. The photosensor arrangement of claim 5 wherein there is further provided a noise suppression delay means for preventing actuation of the lamp for a predetermined period of time after a sudden change in the intensity of the input light.

7. The photosensor arrangement of claim 6 wherein said predetermined period of time corresponds to approximately 30 seconds.

8. The photosensor arrangement of claim 5 wherein there is further provided a timer means for actuating the lamp within a predetermined period of time after a sudden diminution in the intensity of the input light.

9. The photosensor arrangement of claim 8 wherein said predetermined period of time corresponds to approximately 1 second.

10. A system for producing an electrical signal responsive to an input light, the electrical signal being correlated to the input light in accordance with a spectral characteristic corresponding to that of a human eye, the system comprising:

a light-responsive element having a light-sensitive optical input for producing at an electrical output thereof an electrical signal responsive to illumination by a light received at said light-sensitive optical input, the light-responsive element having a predeterminable spectral characteristic;

light diffuser means having a diffuser input for receiving a light input and a diffuser output for producing a diffused output light which is scattered in many directions unrelated to a direction of incidence of the light input, said light diffuser means having a predetermined spectral characteristic; and light modulator means for reducing the intensity of input light striking the diffuser from predetermined angular directions so as to determine the angular sensitivity of the system.

11. A headlamp control system element for a vehicle for producing a headlamp control signal responsive to incidence of ambient light, the headlamp control system element comprising:

light diffuser means having a diffuser input for receiving the incident ambient light and a diffuser output for producing diffused output light which is scattered in many directions unrelated to a direction of incidence of the light input, said light diffuser means having a predetermined spectral characteristic whereby the diffuser output light corresponds to the ambient light modified in accordance with the predetermined spectral characteristic of said light diffuser means;

photodetector means having a light input for receiving the diffused output light and an output terminal for providing an output electrical signal responsive to the diffused output light, said light sensor means having a predetermined photodetector spectral characteristic whereby the output electrical signal corresponds to a response characteristic applied to the ambient light which corresponds to that of a human eye; and lamp control means coupled to the output terminal of said photodetector means for controlling the headlamp in response to the incident ambient input light.

12. The headlamp control system element of claim 11 wherein there is further provided light modulator means for controlling the incidence of the ambient light upon said input of said diffuser means in response to the direction of incidence of the sunlight.

13. The headlamp control system element of claim 11 wherein there is further provided a timer means for actuating the lamp within a predetermined period of time after a sudden diminution in the intensity of the input light.

14. The headlamp control system element of claim 11 wherein said predetermined period of time corresponds to approximately 1 second.

15. The headlamp control system element of claim 11 wherein said predetermined diffuser spectral characteristic (F(λ)) and said predetermined photodetector spectral characteristic (S(λ)) are related to the response characteristic of a human eye (E(λ)), in accordance with the relationship:

$$E(\lambda) = c(F(\lambda))(S(\lambda))$$

where c is a constant.

* * * * *